United States Patent
Umatt et al.

(10) Patent No.: US 10,206,087 B2
(45) Date of Patent: Feb. 12, 2019

(54) REESTABLISHMENT PROCEDURE FOR AN EMERGENCY CALL

(71) Applicant: QUALCOMM Incorporated, San Diego, CA (US)

(72) Inventors: Bhupesh M. Umatt, Poway, CA (US); Daniel Amerga, San Diego, CA (US); Nathan E. Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/479,890

(22) Filed: Sep. 8, 2014

(65) Prior Publication Data
US 2014/0378087 A1  Dec. 25, 2014

Related U.S. Application Data

(62) Division of application No. 12/752,577, filed on Apr. 1, 2010, now Pat. No. 8,831,555.

(60) Provisional application No. 61/166,629, filed on Apr. 3, 2009.

(51) Int. Cl.
| | |
|---|---|
| H04W 36/00 | (2009.01) |
| H04W 4/90 | (2018.01) |
| H04W 36/16 | (2009.01) |
| H04W 48/20 | (2009.01) |

(Continued)

(52) U.S. Cl.
CPC ............ *H04W 4/90* (2018.02); *H04W 36/16* (2013.01); *H04W 48/20* (2013.01); *H04W 76/19* (2018.02); *H04W 76/50* (2018.02); *H04Q 2213/1307* (2013.01); *H04Q 2213/1337* (2013.01);

(Continued)

(58) Field of Classification Search
CPC ... H04W 36/0033; H04W 36/16; H04W 4/22; H04W 48/20; H04W 76/007; H04W 76/028
USPC ......... 455/404.1, 404.2, 434, 436, 438, 450, 455/451, 452.1
See application file for complete search history.

(56) References Cited

U.S. PATENT DOCUMENTS

| | | |
|---|---|---|
| 4,998,291 A | 3/1991 | Marui et al. |
| 5,465,388 A | 11/1995 | Zicker |

(Continued)

FOREIGN PATENT DOCUMENTS

| | | |
|---|---|---|
| CN | 101335993 A | 12/2008 |
| EP | 1211910 | 6/2002 |

(Continued)

OTHER PUBLICATIONS

International Search Report and Written Opinion—PCT/US2010/029858, International Search Authority—European Patent Office—Oct. 26, 2010.

(Continued)

*Primary Examiner* — Jean A Gelin
(74) *Attorney, Agent, or Firm* — Patterson & Sheridan, L.L.P.

(57) ABSTRACT

Traditional rules that apply to cell selection are overridden to allow cell selection on an acceptable cell, in addition to cell selection on a suitable cell. Once a mobile device acquires service on an acceptable cell, mobile device can inform network of the emergency call in progress or initiation of an emergency call, which allows network to perform necessary actions to support the emergency call during establishment/reestablishment.

5 Claims, 13 Drawing Sheets

(51) Int. Cl.
*H04W 76/19* (2018.01)
*H04W 76/50* (2018.01)

(52) U.S. Cl.
CPC ............. *H04Q 2213/13098* (2013.01); *H04W 36/0033* (2013.01)

(56) References Cited

U.S. PATENT DOCUMENTS

| | | | |
|---|---|---|---|
| 5,544,224 A * | 8/1996 | Jonsson | H04W 76/028 455/434 |
| 6,212,173 B1 | 4/2001 | Lindsay et al. | |
| 6,240,284 B1 * | 5/2001 | Bugnon | H04W 4/22 455/404.1 |
| 6,240,285 B1 | 5/2001 | Blum et al. | |
| 6,256,489 B1 * | 7/2001 | Lichter | H04Q 3/66 455/404.2 |
| 6,282,423 B1 | 8/2001 | Scott, II | |
| 6,330,324 B1 | 12/2001 | Sabinson et al. | |
| 6,445,918 B1 * | 9/2002 | Hellander | H04W 76/02 370/331 |
| 6,490,456 B1 * | 12/2002 | Bogdan | H04W 64/00 342/450 |
| 6,519,457 B1 | 2/2003 | Jiang et al. | |
| 6,556,816 B1 * | 4/2003 | Gafrick | H04M 3/42195 379/45 |
| 6,687,497 B1 | 2/2004 | Parvulescu et al. | |
| 6,968,186 B2 | 11/2005 | Pittampalli et al. | |
| 6,990,349 B1 * | 1/2006 | Idrissi | H04Q 3/0079 455/404.1 |
| 7,333,795 B2 | 2/2008 | Dorsey et al. | |
| 7,778,406 B2 | 8/2010 | Erb et al. | |
| 7,894,579 B1 | 2/2011 | Chancellor et al. | |
| 8,831,555 B2 | 9/2014 | Umatt et al. | |
| 9,084,102 B1 * | 7/2015 | Singh | H04W 4/22 |
| 9,554,317 B2 * | 1/2017 | Faccin | H04W 36/24 |
| 2002/0197992 A1 | 12/2002 | Nizri et al. | |
| 2006/0062237 A1 | 3/2006 | Kim | |
| 2006/0094396 A1 | 5/2006 | Raghuram et al. | |
| 2006/0094397 A1 | 5/2006 | Raghuram et al. | |
| 2007/0032219 A1 | 2/2007 | Rudolf et al. | |
| 2007/0123247 A1 | 5/2007 | Hunzinger | |
| 2007/0149166 A1 | 6/2007 | Turcotte et al. | |
| 2007/0184836 A1 * | 8/2007 | He | H04W 52/0245 455/434 |
| 2007/0258406 A1 * | 11/2007 | Kaitz | H04W 36/30 370/331 |
| 2008/0009262 A1 * | 1/2008 | Rudolf | H04W 4/22 455/404.1 |
| 2008/0057944 A1 | 3/2008 | Miriyala et al. | |
| 2008/0102784 A1 | 5/2008 | Mittal et al. | |
| 2008/0123821 A1 | 5/2008 | Goldman et al. | |
| 2008/0205600 A1 | 8/2008 | Sparks et al. | |
| 2009/0061878 A1 | 3/2009 | Fischer | |
| 2009/0067386 A1 | 3/2009 | Kitazoe | |
| 2009/0088154 A1 | 4/2009 | Umatt et al. | |
| 2009/0185524 A1 * | 7/2009 | Sammour | H04J 11/0069 370/328 |
| 2009/0191874 A1 * | 7/2009 | Du | H04W 36/18 455/436 |
| 2009/0298459 A1 * | 12/2009 | Saini | H04W 48/20 455/404.1 |
| 2010/0002579 A1 | 1/2010 | Shi et al. | |
| 2010/0054209 A1 * | 3/2010 | Mandi | H04W 36/0022 370/331 |
| 2010/0130205 A1 * | 5/2010 | Jung | H04W 36/0066 455/435.2 |
| 2010/0159928 A1 | 6/2010 | Wu | |
| 2010/0166153 A1 | 7/2010 | Guleria et al. | |
| 2010/0216469 A1 * | 8/2010 | Yi | H04W 48/20 455/435.3 |
| 2010/0220846 A1 * | 9/2010 | Gisby | H04M 3/56 379/202.01 |
| 2010/0226248 A1 | 9/2010 | Grilli | |
| 2010/0234026 A1 | 9/2010 | Tenny et al. | |
| 2010/0267355 A1 * | 10/2010 | Varney | H04W 76/007 455/404.1 |
| 2010/0323662 A1 * | 12/2010 | Dahlen | H04W 48/02 455/410 |
| 2010/0323749 A1 * | 12/2010 | Lee | H04W 36/28 455/524 |
| 2011/0045820 A1 | 2/2011 | Huber et al. | |
| 2011/0103339 A1 * | 5/2011 | Kim | H04B 7/024 370/329 |
| 2011/0105109 A1 | 5/2011 | Uemura et al. | |
| 2011/0171925 A1 * | 7/2011 | Faccin | H04W 36/24 455/404.1 |
| 2011/0171926 A1 * | 7/2011 | Faccin | H04W 48/18 455/404.1 |
| 2011/0230162 A1 | 9/2011 | Mutikainen et al. | |
| 2011/0242965 A1 * | 10/2011 | Strzyz | H04W 36/06 370/216 |
| 2011/0274012 A1 | 11/2011 | Jang et al. | |
| 2011/0306316 A1 * | 12/2011 | Wu | H04W 76/028 455/404.1 |
| 2012/0082235 A1 | 4/2012 | Lou et al. | |
| 2012/0269100 A1 | 10/2012 | Ress et al. | |
| 2013/0044668 A1 * | 2/2013 | Purnadi | H04W 36/0055 370/312 |
| 2013/0102270 A1 * | 4/2013 | Suh | H04W 4/22 455/404.1 |
| 2014/0378086 A1 | 12/2014 | Umatt et al. | |
| 2015/0296356 A1 * | 10/2015 | Ramamoorthy | H04W 76/50 455/404.1 |
| 2016/0309314 A1 * | 10/2016 | Chong | H04W 4/90 |

FOREIGN PATENT DOCUMENTS

| | | |
|---|---|---|
| JP | 9247748 A | 9/1997 |
| JP | 2007174282 A | 7/2007 |
| JP | 2012044677 A | 3/2012 |
| TW | 200835368 A | 8/2008 |
| TW | 200838277 A | 9/2008 |
| WO | WO-2007144757 A2 | 12/2007 |
| WO | WO-2008073600 A2 | 6/2008 |
| WO | WO-2009150943 A1 | 12/2009 |

OTHER PUBLICATIONS

Partial International Search Report—PCT/US2010/029858, International Search Authority—European Patent Office Jul. 26, 2010.
Taiwan Search Report—TW099110404—TIPO—Oct. 31, 2013.
Taiwan Search Report—TW102124027—TIPO—Jan. 21, 2015.
Taiwan Search Report—TW102124027—TIPO—Aug. 17, 2015.
Kumakura, T., et al., "Non-CE3: Simplified context derivation for significance map", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); pp. 1-8, Apr. 17, 2012 (Apr. 17, 2012), XP030112059.
Marpe D., et al., "Context-based adaptive binary arithmetic coding in the H.264/AVC video compression standard", IEEE Transactions on Circuits and Systems for Video Technology, IEEE Service Center, pp. 620-636, XP011099255, vol. 13 (7), Jul. 2003.
Sze V., et al., "CE3: Summary Report of Core Experiment on Coefficient Scanning and Coding," JCTVC-I0023, ITU T/ISO/IEC JCT-VC meeting, Geneva, Switzerland, Apr.-May 2012.
Taiwan Search Report—TW102124026—TIPO—Apr. 29, 2015.
3GPP: 3GPP TS 36.331 V8.3.0 (Sep. 2008); 3rd Generation Partnership Project; Technical Specification Group Radio Access Network; Evolved Universal Terrestrial Radio Access (E-UTRA); Radio Resource Control (RRC); Protocol Specification (Release 8); pp. 1-9, 90, 91, 107, 110, 111; 3GPP Sep. 23, 2008.
ETSI TS 125 331: "Universal Mobile Telecommunications System (UMTS); Radio Resource Control (RRC); Protocol Specification (3GPP TS 25.331; Version 8.5.0, Release 8)", V8.5.0, Feb. 2009, pp. 188-191, 505-508, 649, URL: http://www.3gpp.org.
LG Electronics Inc: "Cell Selection During Connection Re-Establishment", 3GPP TSG-RAN2 Meeting #64, R2-086720, uploaded on Nov. 4, 2008, pp. 1-4, URL: http://www.3gpp.org.

(56) References Cited

OTHER PUBLICATIONS

3GPP: 3GPP TS 36.304, V8.3.0, (Sep. 2008);3rd Generation Partnership Project, Technical Specification Group Radio Access Network; Evolved Universal Terrestrial Radio Access (E-UTRA); User Equipment (UE) procedures in idle mode (Release 8), Sep. pp. 1-28.
European Search Report—EP18193788—Search Authority—Munich—dated Nov. 7, 2018.

\* cited by examiner

REESTABLISHMENT PROCEDURE FOR AN EMERGENCY CALL

CROSS-REFERENCE

This is a divisional application of U.S. patent application Ser. No. 12/752,577 entitled REESTABLISHMENT PROCEDURE FOR AN EMERGENCY CALL, filed Apr. 1, 2010, assigned U.S. Pat. No. 8,831,555 with an issue date of Sep. 9, 2014, which claims priority to Provisional Application No. 61/166,629 entitled METHOD AND APPARATUS TO ENABLE RE-ESTABLISHMENT PROCEDURES FOR EMERGENCY CALLS, filed Apr. 3, 2009, both assigned to the assignee hereof and hereby expressly incorporated by reference herein.

BACKGROUND

I. Field

The following description relates generally to wireless communications and more particularly to reestablishment procedures in a wireless communications environment.

II. Background

Wireless communication systems are widely deployed to provide various types of communication content, such as voice, data, video, and so forth, and to communicate information regardless of where a user is located (e.g., inside or outside a structure) and whether a user is stationary or moving (e.g., in a vehicle, walking). These systems may be multiple-access systems capable of supporting communication with multiple users by sharing the available systems resources (e.g., bandwidth and transmit power). Multiple-access systems include Frequency Division Multiple Access (FDMA) systems, Time Division Multiple Access (TDMA) systems, Code Division Multiple Access (CDMA) systems, Orthogonal Frequency Division Multiple Access (OFDMA) systems, Third Generation Partnership Project (3GPP) Long Term Evolution (LTE) systems, and others.

Generally, wireless multiple-access communication systems can simultaneously support communication for multiple mobile devices. Each mobile device can communicate with one or more base stations through transmissions on forward and reverse links. The forward link (or downlink) refers to the communication link from base stations to mobile devices. The reverse link (or uplink) refers to the communication link from mobile devices to base stations. These communication links can be established through single-input-single-output (SISO) systems, multiple-input-single-output (MISO) systems, multiple-input-multiple-output (MIMO) systems, and so forth. In addition, mobile devices can communicate with other mobile devices (and/or base stations with other base stations) in peer-to-peer wireless network configurations.

If a radio link failure occurs, a mobile device is configured to perform reestablishment procedures. A purpose of reestablishment procedures is to reestablish a connection, such as an RRC (Radio Resource Control) connection, which involves resumption of SRB1 (Signaling Radio Bearer 1) and reactivation of security. A mobile device can initiate a reestablishment procedure when there is detection of a radio link failure, when there is a handover failure, when there is a mobility from E-UTRA (Evolved UMTS (Universal Mobile Telecommunications System) Terrestrial Radio Access (E-UTRA)) failure, when there is an integrity check failure, and/or when there is a RRC connection reconfiguration failure. Once the reestablishment procedure is initiated, mobile device is required to perform cell selection to obtain service. According to traditional procedures, mobile device can only select a suitable E-UTRA cell for reestablishment. The traditional procedures are acceptable when there is no emergency call. However, when there is an emergency call, mobile device might encounter the situation where no suitable E-UTRA cell is present, but there is an acceptable E-UTRA cell (which is a cell where mobile device can obtain emergency services (only)). Based on the traditional procedures, mobile device will ignore the acceptable E-UTRA cell. Therefore, since mobile device finds no cell on which reestablishment is allowed, mobile device goes to idle mode and the call needs to be reinitiated by the mobile device user, which is an undesirable result in the case of an emergency call.

If an acceptable cell is the only cell available to mobile device, the delay before mobile device enters idle mode can be significant. In the case of a mobile device that supports multiple Radio Access Technologies (RATs), there is the possibility that mobile device is able to find some service on the other RAT. However, searching all frequencies of all RATs may take a long time in the case of a mobile device supporting many technologies. Even in the case of an "LTE only" mobile device, the mobile device will continue to search for any suitable E-UTRA cell until a reestablishment timer (such as T311) expires. In an example, a maximum value of a reestablishment timer can be about 30 seconds, which, in an emergency situation, can be an extremely long time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with reestablishment procedures. According to an aspect is a method performed by a mobile device for reestablishment for emergency calls. Method comprises detecting a radio link failure and determining an emergency call is being made. Method also comprises reestablishing a connection on a cell without considering whether the cell could offer normal service to mobile device.

An aspect relates to a wireless communications apparatus comprising a memory and a processor. Memory retains instructions related to detecting a radio link failure and attempting to connect an emergency call. Memory also retains instructions related to establishing a connection on a cell without considering whether the cell can offer normal service to wireless communications apparatus. Processor is coupled to memory and is configured to execute instructions retained in memory.

Another aspect relates to a wireless communications apparatus that recovers a connection associated with an emergency call on a mobile device. Wireless communications apparatus includes means for ascertaining a radio link failure has occurred and means for receiving a request to connect an emergency communication. Wireless communications apparatus also includes means for establishing the connection on a cell without regard to whether the cell offers normal service to wireless communications apparatus.

In accordance with some aspects, means for receiving further comprises means for originating the emergency call during an attempt to restore an existing connection. According to some aspects, means for establishing comprises means for reestablishing the connection with a Radio Resource Control connection reestablishment procedure. According to some aspects, wireless communications apparatus comprises means for transmitting a reestablishment request message to a base station operating the cell. Reestablishment request message includes information that a reestablishment attempt is related to the emergency call and indicates the emergency call as a cause of reestablishment request message. In accordance with some aspects, means for establishing comprise means for reestablishing the connection with a cell update procedure. According to some aspects, means for establishing comprises means for considering the cell as an acceptable cell.

In accordance with some aspects, wireless communications apparatus includes means for sending a cell update message to a base station operating the cell. Cell update message includes information that a reestablishment attempt is related to the emergency call and indicates the emergency call as a cause of cell update message. According to some aspects, wireless communications apparatus comprises means for identifying the cell for reestablishment though an "Any cell selection" procedure. Means for identifying performs identification after a previous cell selection procedure failed to identify a cell offering normal service to mobile device.

An aspect relates to computer program product comprising a computer-readable medium. Included in computer-readable medium is a first set of codes for causing a computer to detect a radio link failure and a second set of codes for causing computer to determine an emergency call is made by a mobile device. Also included in computer-readable medium is a third set of codes for causing computer to reestablish a connection on a cell without considering whether the cell could offer normal service to mobile device.

Another aspect relates to at least one processor configured to reestablish an emergency call. Processor comprises a first module that ascertains a radio link failure has occurred and a second module that receives a request to connect an emergency communication. Processor also comprises a third module that establishes a connection on a cell without regard to whether the cell offers normal service to a wireless communications apparatus.

An aspect relates to a method for reestablishment for emergency calls. Method comprises accepting a context for a mobile device from a previous serving base station based on admission criteria appropriate for an emergency call.

Another aspect relates to a wireless communications apparatus comprising a memory and a processor. Memory retains instructions related to receiving admission criteria appropriate for an emergency call and accepting a context for a mobile device from a previous serving base station based on admission criteria. Processor is coupled to memory and is configured to execute instructions retained in memory.

An aspect relates to wireless communications apparatus that prepares a base station to accept an attempt by a mobile device to recover a connection associated with an emergency call. Wireless communications apparatus comprises means for accepting from a previous serving base station a context for mobile device based on admission criteria appropriate for the emergency call. In accordance with some aspects, wireless communications apparatus comprises means for receiving an indication from previous serving base station. The indication is included in a handover request message that identifies handover for the emergency call. Means for accepting accepts the context as a function of the indication.

Another aspect relates to a computer program product comprising a computer-readable medium. Included in computer-readable medium is a first set of codes for causing a computer to receive an indication from a previous serving base station. The indication is included in a handover request message that identifies handover for an emergency call. Computer-readable medium also comprises a second set of codes for causing computer to accept a context as a function of the indication.

An aspect relates to at least one processor configured to reestablish an emergency call. Processor includes a first module that receives an indication from a previous serving base station. The indication is included in a handover request message that identifies handover for the emergency call. Processor also comprises a second module that accepts a context as a function of the indication.

An aspect relates to a method for selection by a serving base station of one or more neighboring cells to be prepared in case of radio link failure affecting a connection serving a mobile device in an emergency call. Method comprises including in a selection cells that may not admit mobile device for non-emergency services.

Another aspect relates to a wireless communications apparatus comprising a memory and a processor. Memory retains instructions related to preparing cells in case of radio link failure that affects a connection serving a mobile device in an emergency call. The instructions related to preparing comprise including cells that may not admit mobile device for non-emergency services. Processor is coupled to memory and is configured to execute instructions retained in memory.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

Figure 1:
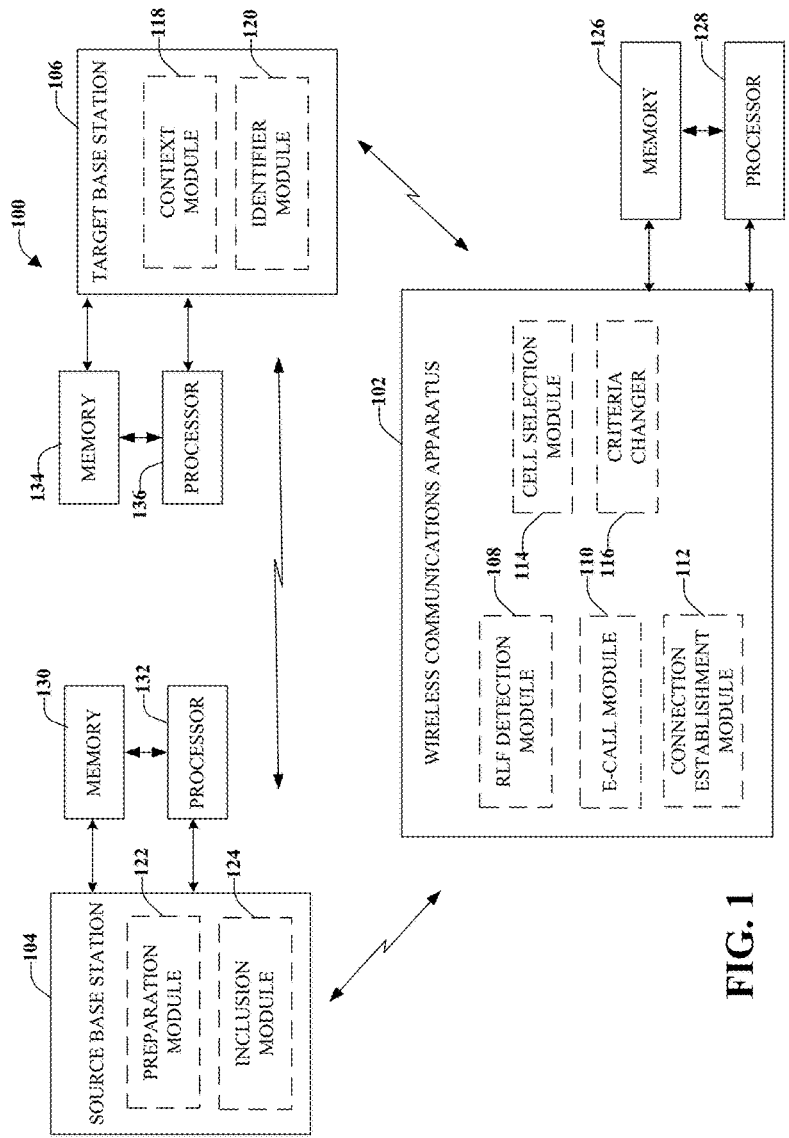
FIG. 1 illustrates a system that is configured to perform reestablishment procedures for emergency calls, according to an aspect.

With reference to FIG. 1, illustrated is a system 100 that is configured to perform reestablishment procedures for emergency calls, according to an aspect. System 100 is configured to allow a mobile device to reestablish a connection associated with an emergency call. Included in system 100 is a wireless communications apparatus 102, a source base station 104 and a target base station 106. Source base station 104 is the base station from which wireless communications apparatus 102 has lost a connection. Target base station 106 is a base station to which wireless communications apparatus 102 reestablishes a connection. In accordance with some aspects, source base station can operate (and perform functions) as a target base station and target base station can operate (and perform functions) as a source base station, depending on which base station wireless communications apparatus 102 is transitioning to/from.

Although a number of devices and cells can be included in system 100, as will be appreciated, a single wireless communications apparatus 102 that transmits communication data signals to a single source base station 104 and a single target base station 106 is illustrated for purposes of simplicity. Further, although various aspects with be described with reference to Long Term Evolution (LTE) and described with reference to LTE terms, the aspects are applicable to any Radio Access Technology (RAT) that has similar reestablishment requirements (e.g., Wideband Code Division Multiple Access (WCDMA), where a similar procedure is a cell update).

Figure 2:
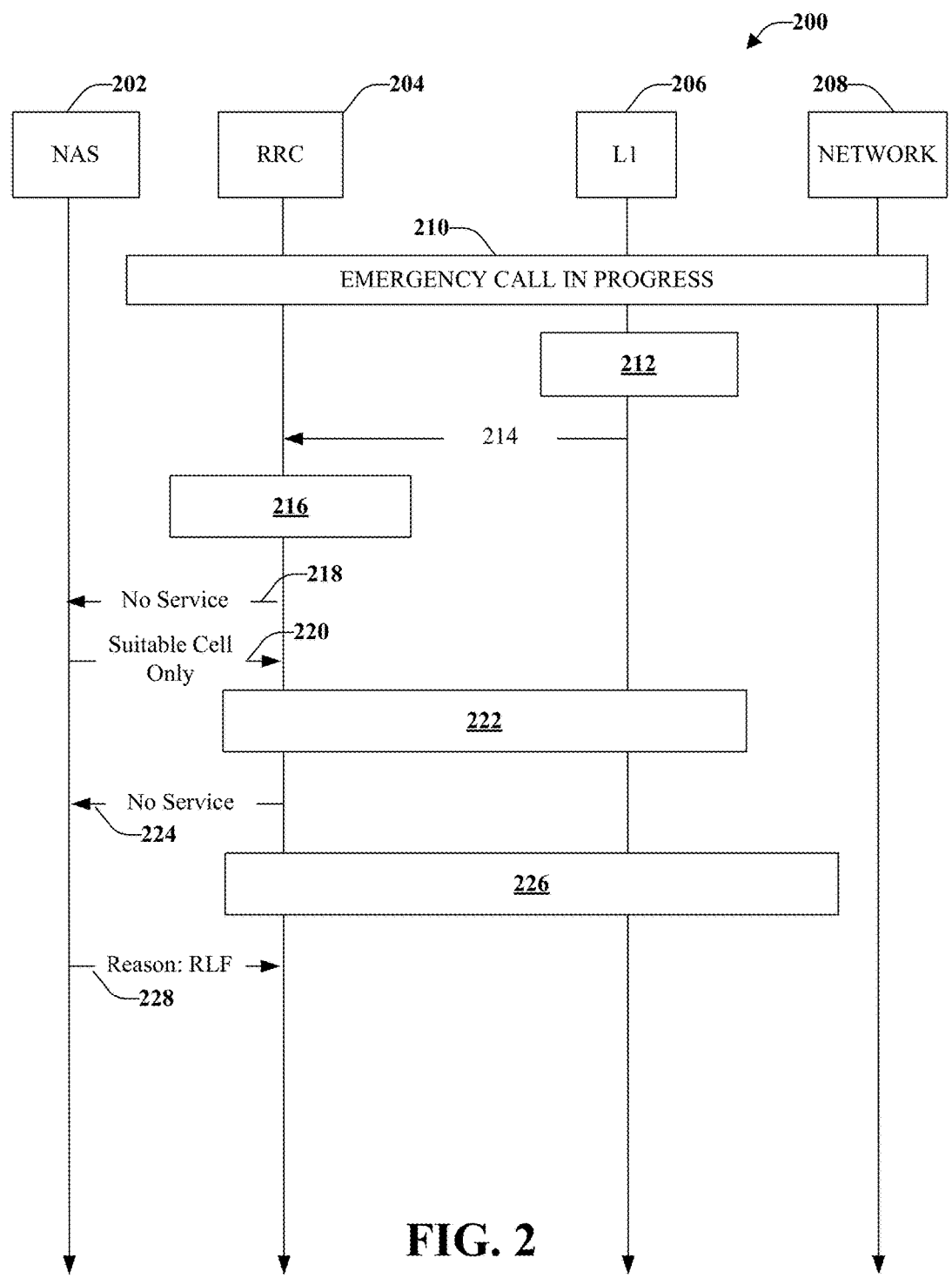
FIG. 2 illustrates a call flow for reestablishment during radio link failure according to traditional procedures.

Existing procedures might result in delays to emergency call reestablishment or establishment of an emergency call when reestablishment for a non-emergency call is in progress. This delay can occur when an Evolved UMTS (Universal Mobile Telecommunications System) Terrestrial Radio Access Network (E-UTRA) cell that can provide emergency services is available For purposes of explanation, FIG. 2 illustrates a call flow 200 for reestablishment during radio link failure according to traditional procedures. Represented by blocks are a Mobile Device Non-Access Stratum (NAS 202), a mobile device Radio Resource Control Layer (RRC 204), a mobile device L1 (L1 206), and a network 208.

Call flow 200 starts with an emergency call in progress 210. A radio link failure (RLF) is detected and a reestablishment timer (e.g., T310) expires 212. L1 206 sends a radio link failure indicator 214 (e.g., LTE_ML1_RADIO_LINK_FAILURE_IND) to RRC 204. At about the same time as receiving radio link failure indicator 214, RRC 204 starts a timer (e.g., T311) and initiates 216 a radio link failure/out of service (RLF/OOS) with NAS 202. A no service indication 218 (e.g., CONN_MODE_SERVICE_IND) is transmitted and a request for a suitable cell only 220 (e.g., CONN-MOD-E_SERVICE_REQ) is sent to RRC 204. As indicated by box 222, under the 3GPP TS 36.331 wireless standard, the mobile device searches and camps only on a suitable cell. Although an acceptable cell can be found (but no suitable cell), mobile device ignores the acceptable cell since reestablishment is possible on suitable cells only. Thus, mobile device does not select the available (acceptable but not suitable) E-UTRA cell and keeps searching for a suitable E-UTRA cell. Reestablishment timer times out and a no service message 224 (e.g., CONN_MODE_SERVICE_IND) is sent to NAS 202. Connected mode resources are torn down and mobile device is transitioned to RRC Idle Mode 226. A connection release indicator 228 (e.g., CONN_RELEASE_IND) is sent with a reason code of Radio Link Failure (RLF).

In accordance with some aspects, rules governing cell selection can be overridden to allow cell selection on an acceptable cell (e.g., an acceptable cell as defined by the wireless standards such as the 3GPP TS 36.304 wireless standard), in addition to cell selection on a suitable cell (e.g., a suitable cell as defined by the wireless standards such as the 3GPP TS 36.304 wireless standard). Once a mobile device acquires service on an acceptable cell, mobile device can inform network of the emergency call in progress or initiation of an emergency call. The information can allow network to perform necessary actions to support the emergency call establishment/reestablishment.

With continuing reference to FIG. 1, during a reestablishment procedure, wireless communications apparatus 102 is permitted to select an acceptable E-UTRA cell, if the reestablishment was triggered during an emergency call. In a similar manner, if an emergency call is attempted while wireless communications apparatus 102 is conducting a reestablishment procedure for a non-emergency call, wireless communications apparatus 102 is permitted to select an acceptable E-UTRA cell. Wireless communications apparatus 102 is configured to inform an acceptable E-UTRA cell about the emergency call though a reestablishment clause ("emergency call"). The reestablishment clause information is conveyed to an acceptable E-UTRA cell to indicate that mobile device is attempting, or has already attempted, an emergency call. The indication allows acceptable E-UTRA cell to perform necessary actions to support the emergency call establishment/reestablishment (and so that network can protect against the procedure being abused by a mobile device that is not actually performing an emergency call).

In accordance with some aspects, wireless communications apparatus 102 includes a radio link failure detection module 108 that is configured to detect when a radio link failure (RLF) occurs. The occurrence of a radio link failure can be while wireless communications apparatus 102 is idle, during a data call, during an emergency call, and so forth.

Also included in wireless communications apparatus 102 is an emergency call (E-Call) module 110 that is configured to determine that an emergency communication is to occur. For example, the determination can be made by E-Call module 110 when a user dials an emergency code (e.g., "911" or other emergency number), when the user selects an emergency option (though screen or keypad), when the user initiates the communication though verbal commands, or by other means).

Also included in wireless communications apparatus 102 is a connection establishment module 112 that is configured to restore a connection on a cell (e.g., target base station 106) without considering whether that cell can normally offer services to wireless communications apparatus 102.

A cell selection module 114 is configured to perform cell selection. When reestablishing with cause "Emergency call", cell selection module 114 first performs cell selection by considering E-UTRA cells only. If no suitable E-UTRA cells are found, cell selection module 114 proceeds to perform "Any cell selection." In accordance with some aspects, the "Any cell selection" is restricted to E-UTRA cells. According to some aspects, "Any cell selection" is not restricted to E-UTRA cells. If cell selection module 114 completes a search for E-UTRA cells, both suitable or acceptable, and none are found, cell selection module 114 performs cell selection across other RATs.

According to some aspects, when reestablishing with cause "Emergency call", cell selection module 114 goes directly into "Any cell selection". In accordance with some aspects, the "Any cell selection" is restricted to E-UTRA cells. According to some aspects, "Any cell selection" is not restricted to E-UTRA cells. Cell selection module 114 may find a cell that is not only acceptable but also suitable. If so, idle-mode behavior will eventually lead wireless communications apparatus 102 to move from the emergency-service-only "camped on any cell" state into the "camped normally" state.

Other aspects are possible and give rise to similar behavior. In the case of reestablishment for an emergency call, wireless communications apparatus 102 may originate the procedure on an acceptable cell. It should be noted that the exact state behavior is not important since wireless communications apparatus 102 is not actually in idle mode. Instead, wireless communications apparatus 102 is reusing an idle-mode procedure in an attempt to remain in RRC_Connected.

Target base station 106 should be aware that it should permit reestablishment for emergency call purposes, even if wireless communications apparatus 102 would not normally be admitted to utilize the services of target base station 106. Further, source base station 104 should include mechanisms for recovery of a connection after reestablishment that take into account the possibility that certain connections (e.g., in 3GPP LTE Release-8 systems) may require preparation of neighbor cells (e.g., target base station 106) that would not normally be considered as recovery candidates for wireless communications apparatus 102.

If handover is needed, source base station 104 should not refuse a request for context transfer from target base station 106, which would not normally service wireless communications apparatus 102. In accordance with some aspects, target base station 106 needs to be prepared with wireless communications apparatus context prior to the actual handover in order to facilitate the handover. In this case, source base station 104, serving an emergency call, can include a preparation module 122 that is configured to prepare target base station 106 against the possibility of a radio link failure. Preparation module 122 can be configured to select one or more neighboring cells (including target base station 106) to be prepared in case of a radio link failure affecting a connection serving wireless communications apparatus 102. Source base station 104 can also include an inclusion module that is configured to include target base station 106 (or other neighboring cells) in a selection even if such cells are not considered suitable cells by wireless communications apparatus 102. For example, a HANDOVER REQUEST message used for preparation of target base station 106 can include a clause field. In order to prepare target base station 106 so that target base station 106 does not reject admission of wireless communications apparatus 102 in appropriately in emergency situation, source base station 104 can send an "Emergency cell" clause value.

Target base station 106 can apply admission criteria appropriate to an emergency call, rather than to an ordinary connection, in determining whether to admit wireless communications apparatus 102. Target base station 106 can include a context module 118 that is configured to accept a context for wireless communications apparatus 102. The context can be received from source base station 104 and can be based on admission criteria appropriate for an emergency call. Also included can be an identifier module 120 that is configured to receive an indication from source base station 104, such as in a handover request message. The indication allows identifier module 120 to determine a cause in the handover request message as a handover for the emergency call.

System 100 can include memory 126 operatively coupled to wireless communications apparatus 102. Memory 126 can be external to wireless communications apparatus 102 or can reside within wireless communications apparatus 102. Memory 126 can store information related to detecting a radio link failure, attempting to connect an emergency call, and establishing a connection on a cell without considering whether the cell can offer normal service to wireless communications apparatus 102. In accordance with some aspects, instructions related to attempting comprise originating the emergency call during an attempt to restore an existing connection. According to some aspects, instructions related to establishing comprise reestablishing the connection with a Radio Resource Control connection reestablishment procedure.

Memory 126 can retain further instructions related to sending a reestablishment request message to a base station operating the cell. The reestablishment request message includes information that a reestablishment attempt is related to the emergency call and indicates the emergency call as a cause of the reestablishment request message. Instructions related to establishing comprise reestablishing the connection with a cell update procedure.

According to some aspects, memory 126 retains further instructions related to sending a cell update message to a base station operating the cell. Cell update message includes information that a reestablishment attempt is related to the emergency call and indicates the emergency call as a cause of the cell update message. Instructions related to establishing comprise considering the cell as an acceptable cell.

In accordance with some aspects, memory 126 retains further instructions related to identifying the cell for reestablishment though an "Any cell selection" procedure. The identifying is performed after a previous cell selection procedure failed to identify a cell offering normal service to a mobile device.

At least one processor 128 can be operatively connected to wireless communications apparatus 102 (and/or memory 126). In accordance with some aspects, processor 128 is configured to reestablish an emergency call. Processor 128 can include a first module that ascertains a radio link failure has occurred and a second module that receives a request to connect an emergency communication. Processor 128 can also include a third module that establishes a connection on a cell without regard to whether the cell offers normal service to a wireless communications apparatus.

In accordance with some aspects, processor 128 includes a fourth module that transmits a reestablishment request message that indicates the emergency call as a cause of the reestablishment request message. According to some aspects, processor 128 comprises a fourth module that transmits a cell update message that indicates the emergency call as a cause of the cell update message.

Source base station 104 can be operatively connected to a memory 130 and/or a processor 132. Memory 130 can retain instructions related to preparing cells (e.g., target base station 106) in case of radio link failure that affects a connection serving a mobile device (e.g., wireless communications apparatus 102) in an emergency call and including cells that may not admit the mobile device for non-emergency services. In accordance with some aspects, memory 130 retains instructions related to preparing additional cells that are not considered suitable cells by the mobile device. Processor 132 can be configured to execute instructions retained in memory.

There can be at least one memory 134 operatively connected to target base station 106. Memory 134 can retain instructions related to receiving admission criteria appropriate for an emergency call and accepting a context for a mobile device (e.g., wireless communications apparatus 102) from a previous serving base station (e.g., source base station 104) based on the admission criteria. In accordance with some aspects, memory 134 retains further instructions related to using the admission criteria based on an indication from the previous serving base station. According to some aspects, memory 134 retains further instructions related to obtaining the indication as part of a handover request message, wherein the handover request message indicates handover for the emergency call.

At least one processor 136 can be operatively connected to target base station 106 (or memory 134). Processor 136 can include a first module that receives an indication from a previous serving base station (e.g., source base station 104). Indication can be included in a handover request message that identifies handover for the emergency call. Processor 136 also comprises a second module that accepts a context as a function of the indication.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 3:
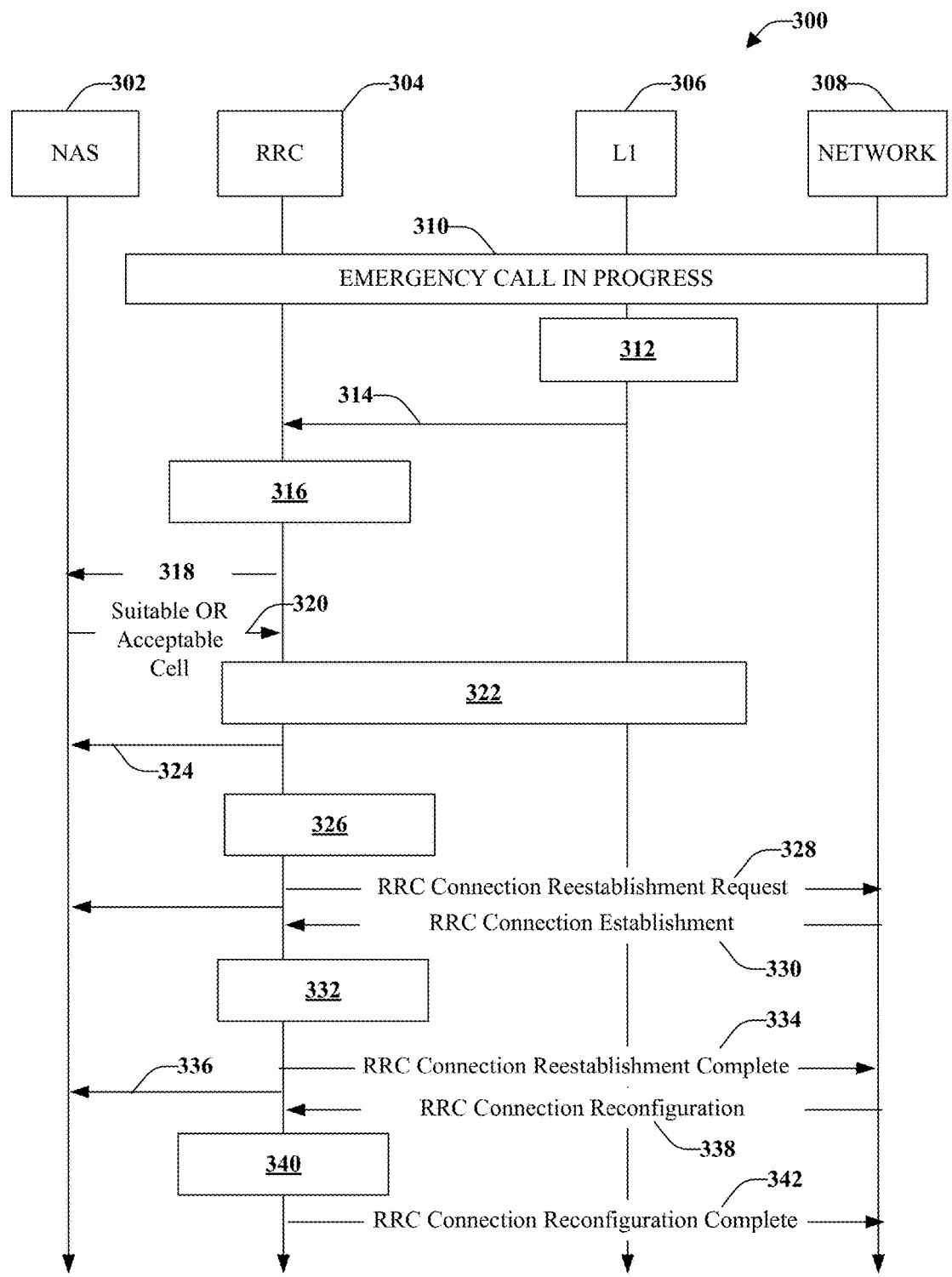
FIG. 3 illustrates a call flow of radio link failure while in an emergency call, according to an aspect.

FIG. 3 illustrates a call flow 300 of radio link failure while in an emergency call, according to an aspect. Represented by blocks are a Mobile Device Non-Access Stratum (NAS 302), a mobile device Radio Resource Control Layer (RRC 304), a mobile device L1 (L1 306), and a network 308. Call flow 300 starts with an emergency call in progress. A radio link failure is discovered at 312 and a reestablishment timer (e.g., T310 timer) expires. An indicator for the radio link failure 314 (e.g., LTE_ML1_RADIO_LINK_FAILURE_IND) is sent to RRC 304. RRC 304 starts a timer (e.g., T311 timer) and initiates a radio link failure/out of service 316 (RLF/OOS) with NAS 302. A no service message 318 (e.g., CONN_MODE_SERVICE_IND) is sent to NAS 302.

NAS 302 requests a connection with a suitable or an acceptable cell 320 (e.g., CONN_MODE_SERVICE_REQ message). At 322, mobile device searches and camps on an acceptable cell or a suitable cell and reads one or more system information blocks (SIBs). Mobile device configures MAC and L1 with common configuration and configures default dedication configuration. Timer (e.g., T311) is stopped. A message 324 is sent to NAS 302 that indicates whether mobile device camped on a suitable cell or an acceptable cell (e.g., CONN_MODE_SERVICE_IND).

RRC 304 initiates reestablishment procedures 326 (e.g., starts T301). A RRC connection reestablishment request 328 can be sent to network 308. Request 328 can include a cause Emergency Call. Network 308 replies with a RRC connection reestablishment request message 330. RRC 304 resumes SRB1 operation 332. A RRC connection reestablishment complete message 334 is sent to network and a message 336 that includes cell specification information (e.g., CONN_MODE_CELL_CHANGE_IND) is sent to NAS 302. Network 308 replies with an RRC connection reconfiguration message 338. RRC 304 resumes SRB2 operation and resumes all DRB operations 340. A RRC connection reconfiguration complete message 342 is sent to network 308 to complete call flow 300.

Figure 4:
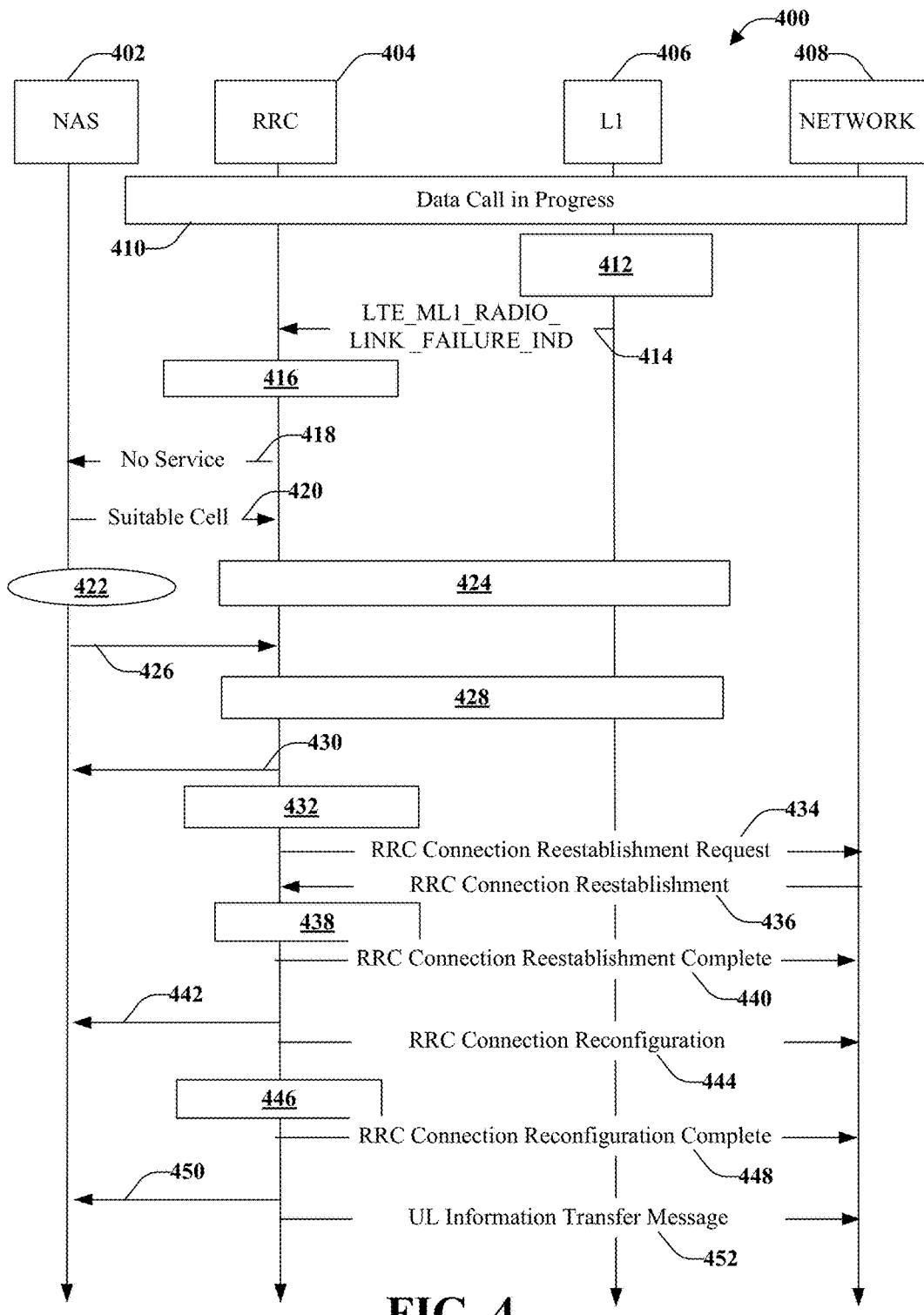
FIG. 4 illustrates a call flow of an emergency call that is attempted while in Radio Link Failure recovery mode, according to an aspect.

FIG. 4 illustrates a call flow 400 of an emergency call that is attempted while in Radio Link Failure recovery mode, according to an aspect. Represented by blocks are a Mobile Device Non-Access Stratum (NAS 402), a mobile device Radio Resource Control Layer (RRC 404), a mobile device L1 (L1 406), and a network 408.

Call flow 400 starts when a data call is in progress 410. A radio link failure is detected 412 (and/or a reestablishment timer (e.g., T310 timer) expires). A failure message 414 (e.g., LTE_ML1_RADIO_LINK_FAILURE_IND) is sent to RRC 404, which starts a timer (e.g., T311) and initiates radio link failure/out of service 416 (RLF/OOS) with NAS 402. A message indicating no service 418 (e.g., CONN_MODE_SERVICE_IND) is sent to NAS 402, which replies with a request for a suitable cell 420 (e.g., CONN_MODE_SERVICE_REQ).

An emergency call 422 is triggered (e.g., by a user) while a search for suitable cell is ongoing 424. As a function of the emergency call 422, NAS 402 requests a search for suitable cells and acceptable cells 426 (e.g., CONN_MODE_SERVICE_REQ). Mobile device searches and camps on acceptable cells or suitable cells 428. Mobile device reads one or more SIBs, configures MAC and L1 with common configuration, and stops timer (e.g., T311). An indication 430 is sent to NAS 402 that indicates whether mobile device camped on a suitable cell or an acceptable cell (e.g., CONN_MODE_SERVICE_IND).

A reestablishment procedures is initiated 432 and a timer (e.g., T301) is started. An RRC Connection Reestablishment Request 434 is sent to Network. Request 434 can include a cause as Emergency call. Network 408 replies with a RRC Connection Reestablishment 436 and RRC 404 resumes SRB1 operation 438. A RRC Connection Reestablishment Complete message 440 is sent to network 408. A message 442 is sent to NAS, such as a message that contains cell specific information (CONN_MODE_CELL_CHANGE_IND). Network 408 replies with a RRC Connection Reconfiguration message 444. RRC 404 resumes SRB2 operation and all DRB operations 446. A RRC Connection Reconfiguration Complete message 448 is sent to network 408. NAS 402 sends a data request 450 (e.g., LLE_RRC_UL_DATA_REQ) for emergency call. An uplink information transfer message 452 is sent to network 408, which ends call flow.

In view of exemplary systems shown and described herein, methodologies that may be implemented in accordance with the disclosed subject matter, will be better appreciated with reference to various call flows and/or flow charts. While, for purposes of simplicity of explanation, some methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
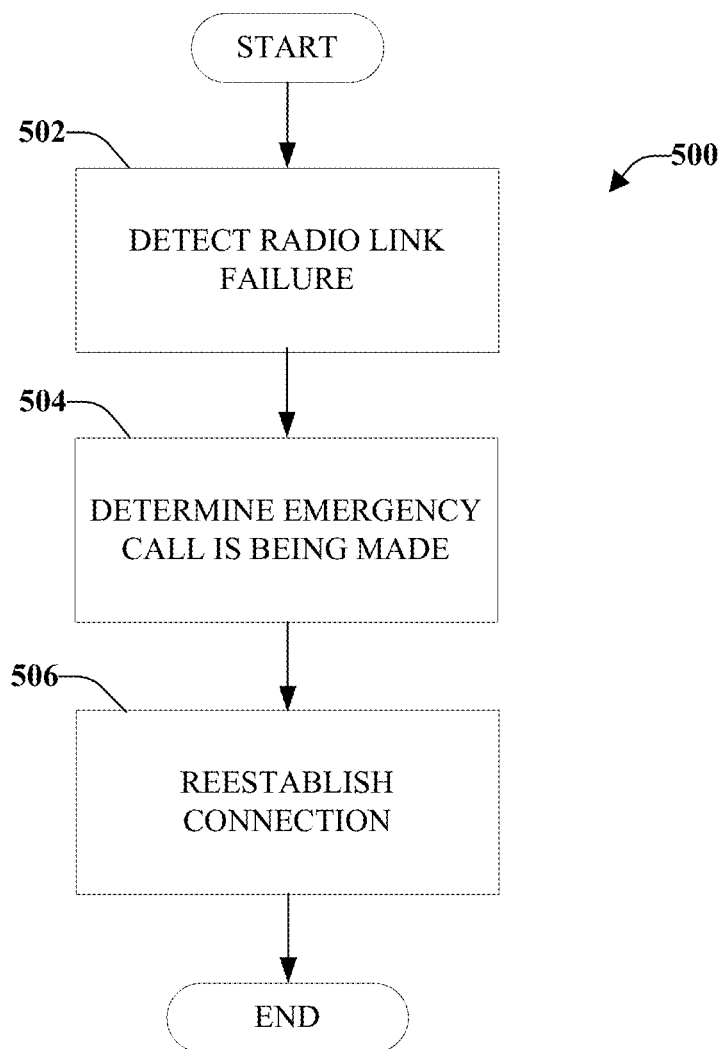
FIG. 5 illustrates a method for recovery of a connection associated with an emergency call on a mobile device, according to an aspect.

FIG. 5 illustrates a method 500 for recovery of a connection associated with an emergency call on a mobile device, according to an aspect. Method 500 starts, at 502, when a radio link failure is detected. At 504, it is determined that an emergency call is being made, such as by a user of mobile device. The determination can include detecting the emergency call is originated during an attempt to restore an existing connection.

A connection is reestablished on a cell, at 506. The connection can be reestablished without considering whether the cell could offer normal service to the mobile device. In accordance with some aspects, the reestablishing comprises restoring the connection with a Radio Resource Control connection reestablishment procedure. A reestablishment request message can be sent to a base station operating the cell. Reestablishment request message includes information that a reestablishment attempt is related to the emergency call. Sending the message can include indicating in the reestablishment request message the emergency call as a cause of the reestablishment request message.

According to some aspects, reestablishing, at 506, comprises restoring the connection with a cell update procedure. A cell update message is sent to a base station operating the cell. Cell update message includes information that a reestablishment attempt is related to the emergency call. Sending the cell update message can include indicating in the cell update message the emergency call as a cause of the cell update message.

According to some aspects, reestablishing the connection, at 506, comprises considering the cell as an acceptable cell. Method 500 can comprise identifying the cell for reestablishment though an "Any cell selection" procedure. The identification can be performed after a previous cell selection procedure failed to identify a cell offering normal service to mobile device.

In accordance with some aspects, a computer program product can include a computer-readable medium that comprises codes for carrying out various aspects of method 500. Computer-readable medium can include a first set of codes for causing a computer to detect a radio link failure. Also included is a second set of codes for causing computer to determine an emergency call is made by a mobile device. Computer-readable medium includes a third set of codes for causing the computer to reestablish a connection on a cell without considering whether the cell could offer normal service to mobile device.

In accordance with some aspects, computer-readable medium includes a fourth set of codes for causing computer to transmit a reestablishment request message that indicates the emergency call as a cause of the reestablishment request message. According to some aspects, computer-readable medium includes a fourth set of codes for causing computer to transmit a cell update message that indicates the emergency call as a cause of the cell update message.

Figure 6:
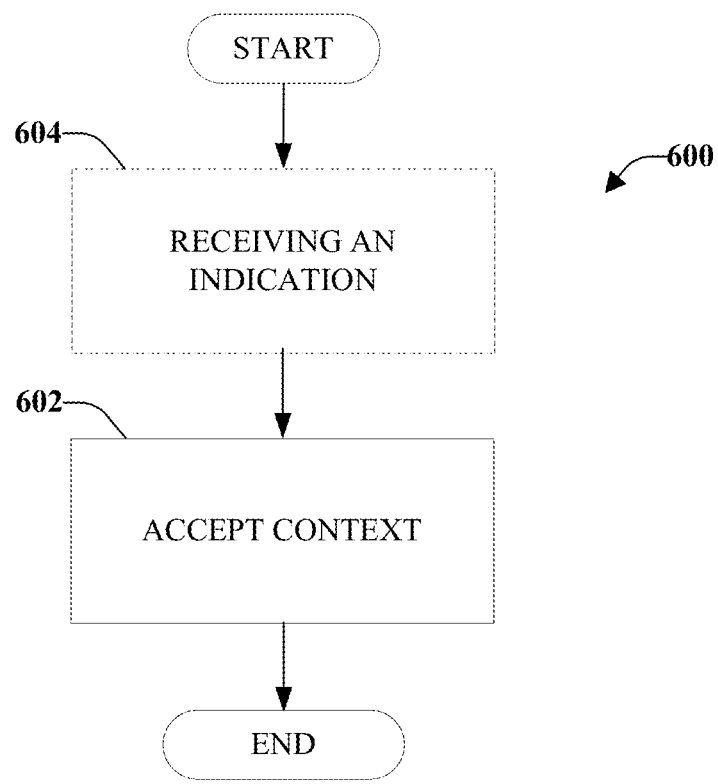
FIG. 6 illustrates a method for preparation of a base station to accept an attempt of a mobile device to recover a connection associated with an emergency call, according to an aspect.

FIG. 6 illustrates a method 600 for preparation of a base station to accept an attempt of a mobile device to recover a connection associated with an emergency call, according to an aspect. Method 600 starts, at 602, when a context for a mobile device is accepted. Context can be accepted from a previous serving base station based on admission criteria appropriate for an emergency call.

In accordance with some aspects, method 600, includes receiving an indication from the previous serving base station, at 604. The acceptance of the context can be based on the indication. According to some aspects, the indication is received as part of a handover request message. Method 600 can also include determining based at least in part on a cause in the handover request message that the requested handover is identified as a handover for the emergency call.

In accordance with some aspects, a computer program product can include a computer-readable medium that comprises codes for carrying out various aspects of method 600. Computer-readable medium can include a first set of codes for causing a computer to receive an indication from a previous serving base station. Indication can be included in a handover request message that identifies handover for a emergency call. Computer-readable medium can also include a second set of codes for causing computer to accept a context as a function of the indication.

In accordance with some aspects is a method for selection by a serving base station of one or more neighboring cells to be prepared in case of radio link failure affecting a connection serving a mobile device in an emergency call. Method can comprise including in a selection those cells that may not admit mobile device for non-emergency services. The including can comprise including cells that are not considered as suitable cells by mobile device.

Figure 7:
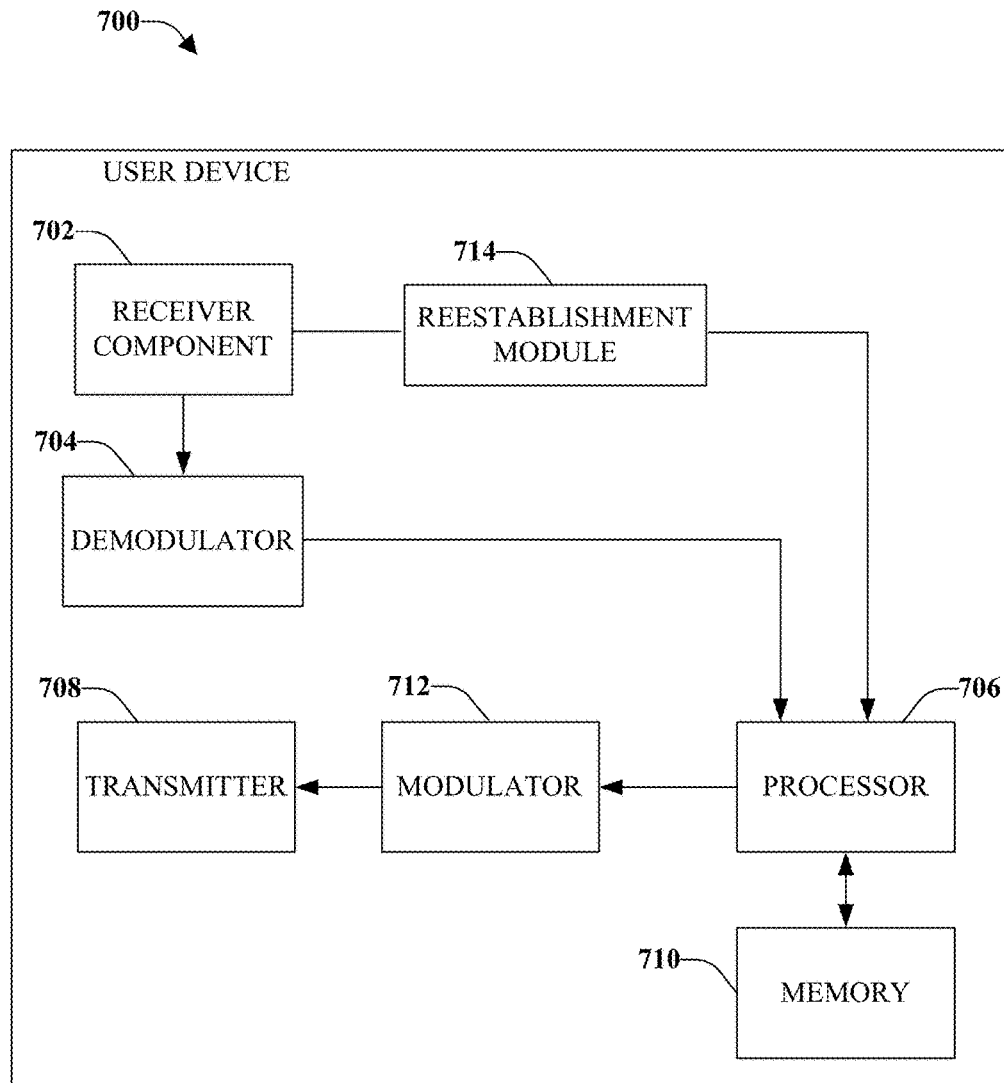
FIG. 7 illustrates a system that facilitates reestablishment for emergency calls in accordance with one or more of the disclosed aspects.

With reference now to FIG. 7, illustrated is a system 700 that facilitates reestablishment for emergency calls in accordance with one or more of the disclosed aspects. System 700 can reside in a user device. System 700 comprises a receiver component 702 that can receive a signal from, for example, a receiver antenna. Receiver component 702 can perform typical actions thereon, such as filtering, amplifying, downconverting, etc. the received signal. Receiver component 702 can also digitize the conditioned signal to obtain samples. A demodulator 704 can obtain received symbols for each symbol period, as well as provide received symbols to a processor 706.

Processor 706 can be a processor dedicated to analyzing information received by receiver component 702 and/or generating information for transmission by a transmitter 708. In addition or alternatively, processor 706 can control one or more components of user device, analyze information received by receiver component 702, generate information for transmission by transmitter 708, and/or control one or more components of user device. Processor 706 may include a controller component capable of coordinating communications with additional user devices.

System 700 can additionally comprise memory 710 operatively coupled to processor 706. Memory 710 can store information related to coordinating communications and any other suitable information. Memory 710 can additionally store protocols associated with reestablishment procedures. Memory 710 of the various aspects is intended to comprise, without being limited to, these and any other suitable types of memory. System 700 can further comprise a symbol modulator 712, wherein transmitter 708 transmits the modulated signal.

Receiver component 702 is further operatively coupled to a reestablishment module 714 that is configured to inform network of an emergency call in progress or can inform network of initiation of an emergency call. The information is provided to network so that if a radio link failure occurs, network can be configured to provide emergency services to mobile device.

Figure 8:
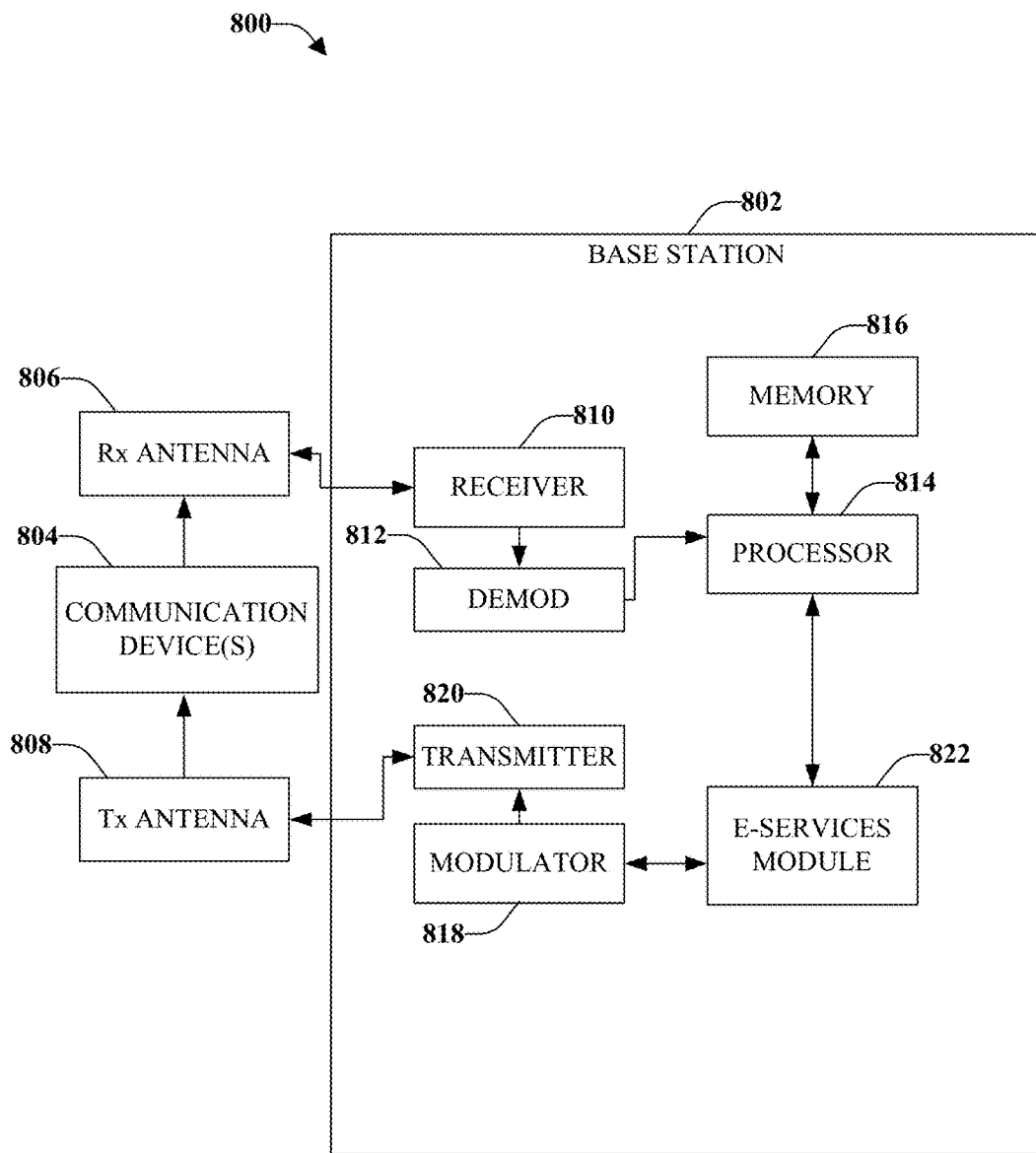
FIG. 8 is an illustration of a system that facilitates reestablishment for emergency calls in accordance with various aspects presented herein.

FIG. 8 is an illustration of a system 800 that facilitates reestablishment for emergency calls in accordance with various aspects presented herein. System 800 comprises an access point or base station 802. As illustrated, base station 802 receives signal(s) from one or more communication devices 804 (e.g., user device) by a receive antenna 806, and transmits to the one or more communication devices 804 through a transmit antenna 808.

Base station 802 comprises a receiver 810 that receives information from receive antenna 806 and is operatively associated with a demodulator 812 that demodulates received information. Demodulated symbols are analyzed by a processor 814 that is coupled to a memory 816 that stores information related to reestablishment procedures. A modulator 818 can multiplex the signal for transmission by a transmitter 820 through transmit antenna 808 to communication devices 804.

Processor 814 is further coupled to an E-services module 822 that is configured to provide services to a mobile device during an emergency communication, even though mobile device might not be served for a non-emergency communications. In accordance with some aspects, E-services module 822 is configured to prepare another node to accept a mobile device during an emergency situation.

Figure 9:
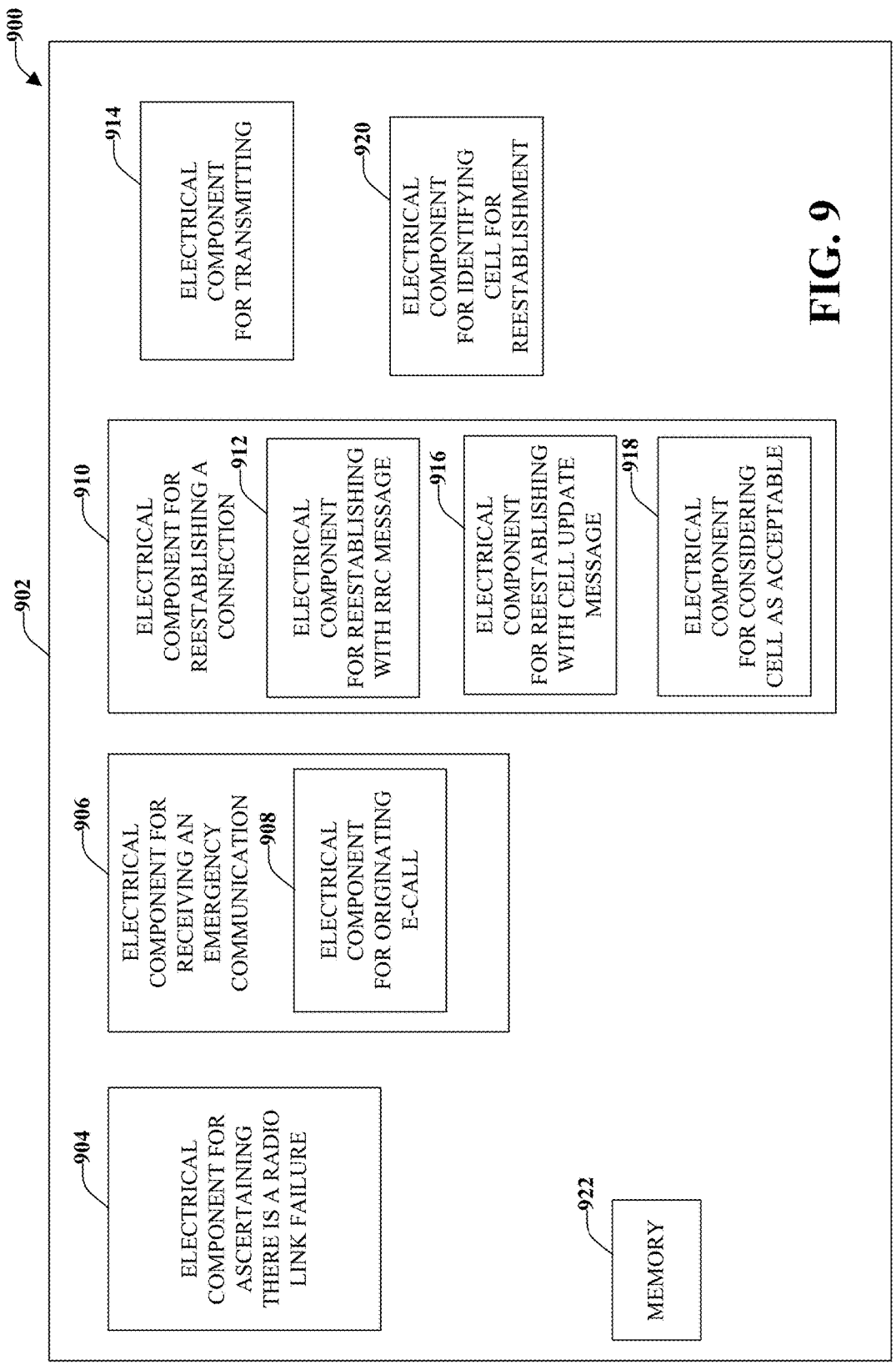
FIG. 9 illustrates an example system that recovers a connection associated with an emergency call, according to an aspect.

With reference to FIG. 9, illustrated is an example system 900 that recovers a connection associated with an emergency call, according to an aspect. System 900 may reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 may include an electrical component 904 for ascertaining a radio link failure has occurred. The radio link failure can occur during an emergency call, during a data call, or at a different time (e.g., when device is idle).

Logical grouping 902 also includes an electrical component 906 for receiving a request to connect an emergency communication. In accordance with some aspects, electrical component 906 includes an electrical component 908 for originating the emergency call during an attempt to restore an existing connection.

Also included in logical grouping 902 is an electrical component 910 for reestablishing a connection on a cell without regard to whether the cell offers normal service to wireless communications apparatus. In accordance with some aspects, electrical component 910 includes an electrical component 912 reestablishing the connection with a Radio Resource Control connection reestablishment procedure. Logical grouping 902 can include an electrical component 914 for transmitting that sends a reestablishment request message to a base station operating the cell. Reestablishment request message includes information that a reestablishment attempt is related to the emergency call and indicates the emergency call as a cause of the reestablishment request message.

In accordance with some aspects, electrical component 910 includes an electrical component 916 for reestablishing the connection with a cell update procedure. Electrical component 914 can send a cell update message to a base station operating the cell. Cell update message includes information that a reestablishment attempt is related to the emergency call and indicates the emergency call as a cause of the cell update message. According to some aspects, electrical component 910 includes an electrical component 918 for considering the cell as an acceptable cell.

Also included in logical grouping 902 is an electrical component 920 for identifying the cell for reestablishment. The identification can be though an "Any cell selection" procedure. Electrical component 920 can perform the identifying after a previous cell selection procedure failed to identify a cell offering normal service to the mobile device.

Additionally, system 900 can include a memory 922 that retains instructions for executing functions associated with electrical components 904-920 or other components. While shown as being external to memory 922, it is to be understood that one or more of electrical components 904-920 may exist within memory 922.

Figure 10:
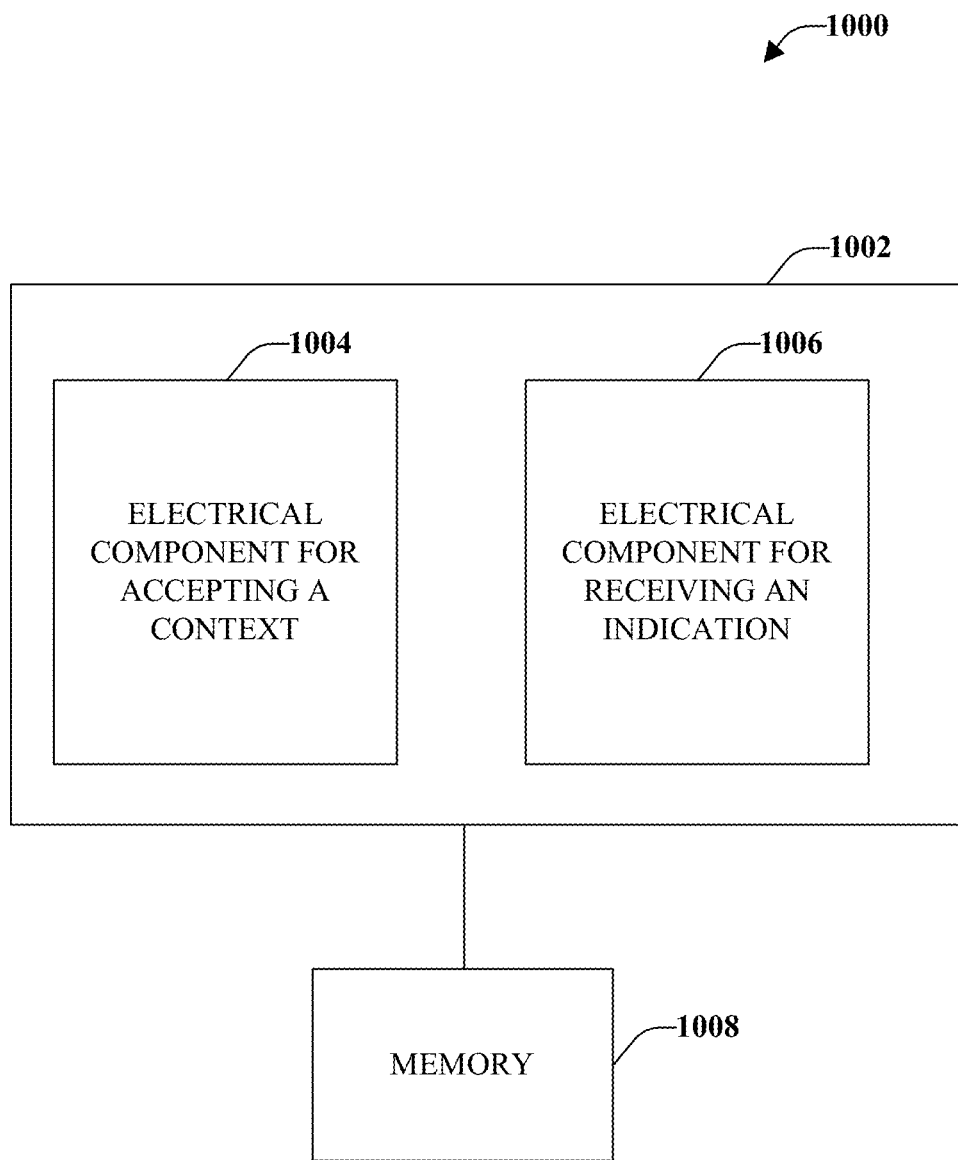
FIG. 10 illustrates an example system that prepares a base station to accept an attempt by a mobile device to recover a connection associated with an emergency call, according to an aspect.

With reference to FIG. 10, illustrated is an example system 1000 that prepares a base station to accept an attempt by a mobile device to recover a connection associated with an emergency call, according to an aspect. System 1000 may reside at least partially within a base station. System 1000 is represented as including functional blocks, which may be functional blocks that represent functions implemented by a processor, software, or combination thereof (e.g., firmware).

System 1000 includes a logical grouping 1002 of electrical components that can act separately or in conjunction. Logical grouping 1002 may include an electrical component 1004 for accepting from a previous serving base station a context for the mobile device based on admission criteria appropriate for the emergency call. Logical grouping 1002 can also include an electrical component 1006 for receiving an indication from the previous serving base station. Indication is included in a handover request message that identifies handover for the emergency call. Electrical component 1004 can accept the context as a function of the indication. In accordance with some aspects, an electrical component for including in a selection cells that may not admit the mobile device for non-emergency services is included in logical grouping 1002.

Additionally, system 1000 can include a memory 1008 that retains instructions for executing functions associated with electrical components 1004 and 1006 or other components. While shown as being external to memory 1008, it is to be understood that one or more of electrical components 1004 and 1006 may exist within memory 1008.

Figure 11:
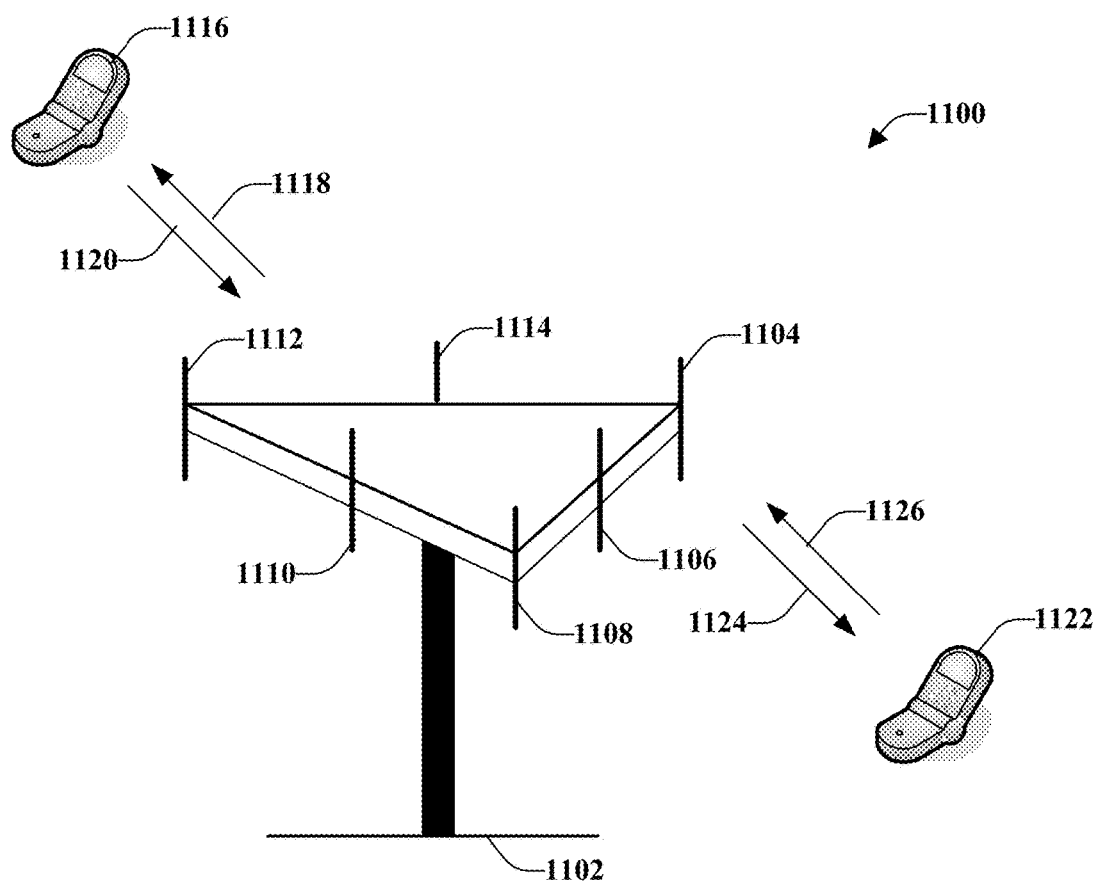
FIG. 11 illustrates a multiple access wireless communication system according to one or more aspects.

Referring now to FIG. 11, a multiple access wireless communication system 1100 according to one or more aspects is illustrated. A wireless communication system 1100 can include one or more base stations in contact with one or more user devices. Each base station provides coverage for a plurality of sectors. A three-sector base station 1102 is illustrated that includes multiple antenna groups, one including antennas 1104 and 1106, another including antennas 1108 and 1110, and a third including antennas 1112 and 1114. According to the figure, only two antennas are shown for each antenna group, however, more or fewer antennas may be utilized for each antenna group. Mobile device 1116 is in communication with antennas 1112 and 1114, where antennas 1112 and 1114 transmit information to mobile device 1116 over forward link 1118 and receive information from mobile device 1116 over reverse link 1120. Forward link (or downlink) refers to communication link from base stations to mobile devices, and reverse link (or uplink) refers to communication link from mobile devices to base stations. Mobile device 1122 is in communication with antennas 1104 and 1106, where antennas 1104 and 1106 transmit information to mobile device 1122 over forward link 1124 and receive information from mobile device 1122 over reverse link 1126. In a FDD system, for example, communication links 1118, 1120, 1124, and 1126 might utilize different frequencies for communication. For example, forward link 1118 might use a different frequency than the frequency utilized by reverse link 1120.

Each group of antennas and/or the area in which they are designated to communicate may be referred to as a sector of base station 1102. In one or more aspects, antenna groups each are designed to communicate to mobile devices in a sector or the areas covered by base station 1102. A base station may be a fixed station used for communicating with mobile devices.

In communication over forward links 1118 and 1124, transmitting antennas of base station 1102 can utilize beamforming in order to improve a signal-to-noise ratio of forward links for different mobile devices 1116 and 1122. Also, a base station utilizing beamforming to transmit to mobile devices scattered randomly through its coverage area might cause less interference to mobile devices in neighboring cells than the interference that can be caused by a base station transmitting through a single antenna to all mobile devices in its coverage area.

Figure 12:
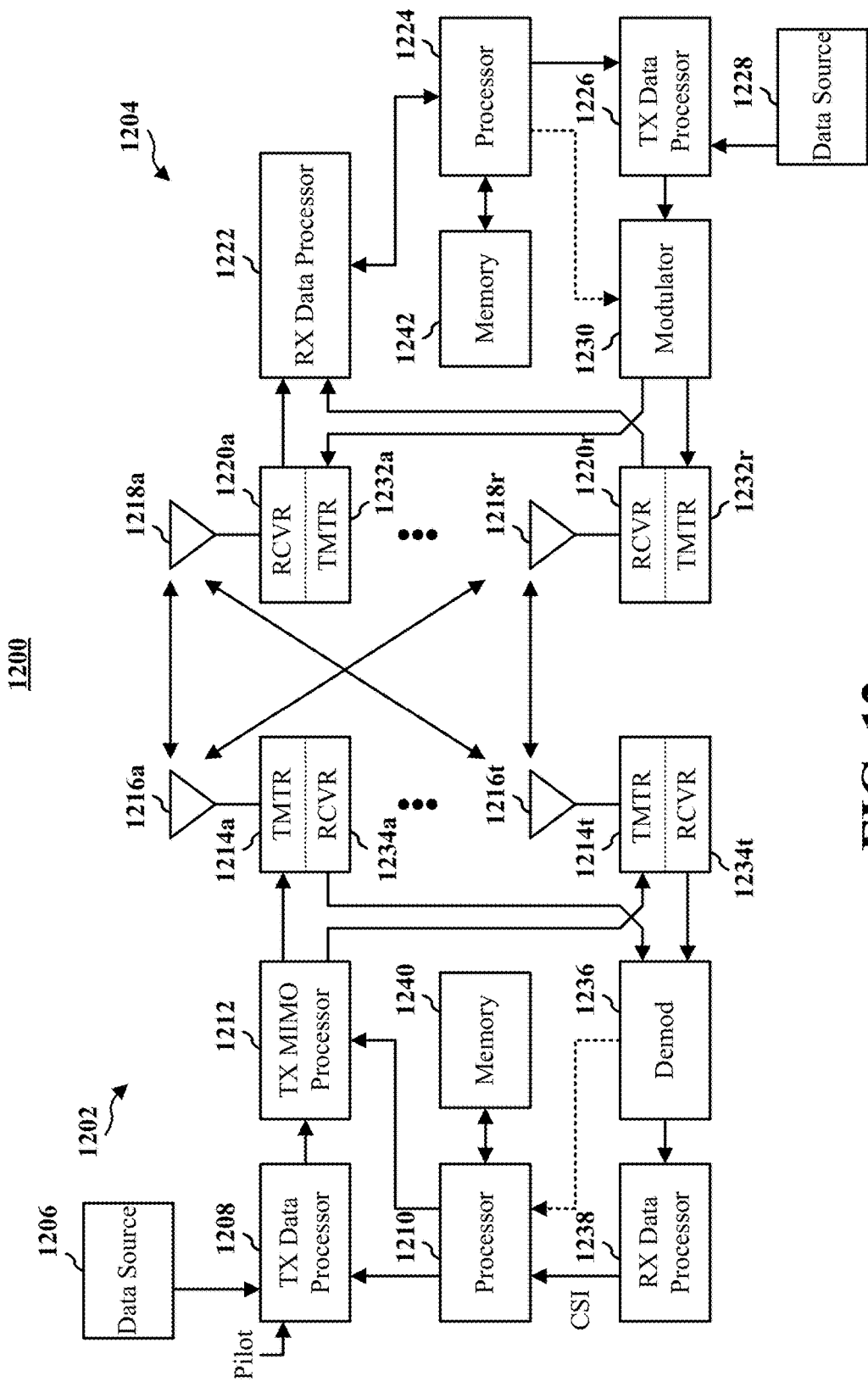
FIG. 12 illustrates an example wireless communication system, according to an aspect.

FIG. 12 illustrates an example wireless communication system 1200. The wireless communication system 1200 depicts one base station 1202 and one mobile device 1204 for sake of brevity. However, it is to be appreciated that system 1200 can include more than one base station and/or more than one mobile device, wherein additional base stations and/or mobile devices can be substantially similar or different from example base station 1202 and mobile device 1204 described below. In addition, it is to be appreciated that base station 1202 and/or mobile device 1204 can employ the systems and/or methods described herein to facilitate wireless communication there between.

At base station 1202, traffic data for a number of data streams is provided from a data source 1206 to a transmit (TX) data processor 1208. According to an example, each data stream can be transmitted over a respective antenna. TX data processor 1208 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1204 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1210.

The modulation symbols for the data streams can be provided to a TX MIMO processor 1212, which can further process the modulation symbols (e.g., for OFDM). TX MIMO processor 1212 then provides $N_T$ modulation symbol streams to $N_T$ transmitters (TMTR) 1214a through 1214t. In various embodiments, TX MIMO processor 1212 applies beamforming weights to the symbols of the data streams and to the antenna from which the symbol is being transmitted.

Each transmitter 1214 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1214a through 1214t are transmitted from $N_T$ antennas 1216a through 1216t, respectively.

At mobile device 1204, the transmitted modulated signals are received by $N_R$ antennas 1218a through 1218r and the received signal from each antenna 1218 is provided to a respective receiver (RCVR) 1220a through 1220r. Each receiver 1220 conditions (e.g., filters, amplifies, and downconverts) a respective signal, digitizes the conditioned signal to provide samples, and further processes the samples to provide a corresponding "received" symbol stream.

An RX data processor 1222 can receive and process the $N_R$ received symbol streams from $N_R$ receivers 1220 based on a particular receiver processing technique to provide $N_T$ "detected" symbol streams. RX data processor 1222 can demodulate, deinterleave, and decode each detected symbol stream to recover the traffic data for the data stream. The processing by RX data processor 1222 is complementary to that performed by TX MIMO processor 1212 and TX data processor 1208 at base station 1202.

A processor 1224 can periodically determine which precoding matrix to utilize as discussed above. Further, processor 1224 can formulate a reverse link message comprising a matrix index portion and a rank value portion.

The reverse link message can comprise various types of information regarding the communication link and/or the received data stream. The reverse link message can be processed by a TX data processor 1226, which also receives traffic data for a number of data streams from a data source 1228, modulated by a modulator 1230, conditioned by transmitters 1232a through 1232r, and transmitted back to base station 1202.

At base station 1202, the modulated signals from mobile device 1204 are received by antennas 1216, conditioned by receivers 1234a though 1234t, demodulated by a demodulator 1236, and processed by a RX data processor 1238 to extract the reverse link message transmitted by mobile device 1204. Further, processor 1210 can process the extracted message to determine which precoding matrix to use for determining the beamforming weights.

Processors 1210 and 1224 can direct (e.g., control, coordinate, manage, etc.) operation at base station 1202 and mobile device 1204, respectively. Respective processors 1210 and 1224 can be associated with memory 1240 and 1242 that store program codes and data. Processors 1210 and 1224 can also perform computations to derive frequency and impulse response estimates for the uplink and downlink, respectively.

Figure 13:
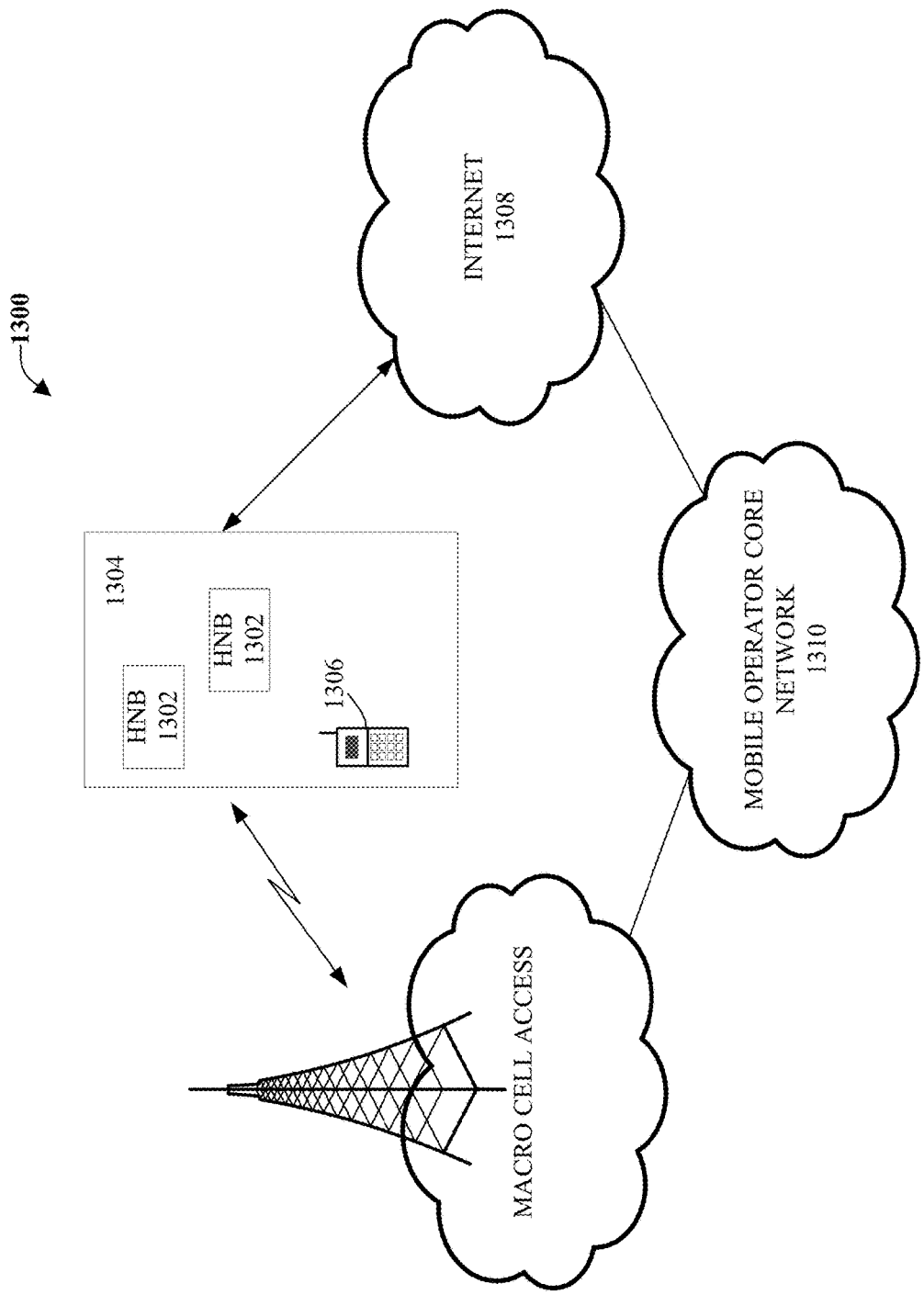
FIG. 13 illustrates an exemplary communication system that enables deployment of access point base stations within a network environment.

FIG. 13 illustrates an exemplary communication system 1300 that enables deployment of access point base stations within a network environment. System 1300 includes multiple access point base stations or, in the alternative, femto cells, Home Node B units (HNBs), or Home evolved Node B units (HeNBs), such as, for example, HNBs 1302, each being installed in a corresponding small scale network environment, such as, for example, in one or more user residences 1304, and being configured to serve associated, as well as alien, user equipment (UE) or mobile stations 1306. Each HNB 1302 is further coupled to the Internet 1308 and a mobile operator core network 1310 through a DSL router (not shown) or, alternatively, a cable modem (not shown).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE), and the like. A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, eNodeB, eNB, or some other network entity.

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

Additionally, in the subject description, the word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is intended to present concepts in a concrete manner.

What is claimed is:

1. A method performed by a serving base station, the method comprising:
    selecting, while serving a mobile device for an emergency call, one or more neighboring cells to be prepared in case of radio link failure affecting a connection serving the mobile device, wherein the selected one or more neighboring cells includes one or more neighboring cells that are considered as acceptable cells but not suitable cells to admit the mobile device for non-emergency services; and
    preparing, while serving the mobile device for the emergency call, one or more of the selected neighboring cells for a handoff of the mobile device.

2. The method of claim 1, wherein preparing the one or more of the selected neighboring cells comprises providing a context of the mobile device to the neighboring cells.

3. A wireless communications apparatus, comprising:
    a memory that retains instructions stored thereon, wherein the instructions comprise:
        instructions for selecting, while serving a mobile device for an emergency call, one or more neighboring cells to be prepared in case of radio link failure affecting a connection serving the mobile device, wherein the selected one or more neighboring cells includes one or more neighboring cells that are considered as acceptable cells but not suitable cells to admit the mobile device for non-emergency services; and
        instructions for preparing, while serving the mobile device for the emergency call, one or more of the selected neighboring cells for a handoff of the mobile device; and
    a processor, coupled to the memory, configured to execute the instructions retained in the memory.

4. A wireless communications apparatus the apparatus comprising:
    means for selecting, while serving a mobile device for an emergency call, one or more neighboring cells to be prepared in case of radio link failure affecting a connection serving the mobile device, wherein the selected one or more neighboring cells includes one or more neighboring cells that are considered as acceptable cells but not suitable cells to admit the mobile device for non-emergency services; and
    means for preparing, while serving the mobile device for the emergency call, one or more of the selected neighboring cells for a handoff of the mobile device.

5. A non-transitory computer readable medium having computer-executable code stored thereon, the computer-executable code comprising:
    a first set of codes for selecting, by a serving base station, while serving a mobile device for an emergency call, one or more neighboring cells to be prepared in case of radio link failure affecting a connection serving the mobile device, wherein the selected one or more neighboring cells includes one or more neighboring cells that are considered as acceptable cells but not suitable cells to admit the mobile device for non-emergency services; and
    a second set of codes for preparing, while serving the mobile device for the emergency call, one or more of the selected neighboring cells for a handoff of the mobile device.

* * * * *